United States Patent [19]
Johansson et al.

[11] Patent Number: 5,255,298
[45] Date of Patent: Oct. 19, 1993

[54] LOCKING SLEEVE PLENUM SPRING RETAINER

[75] Inventors: Eric B. Johansson; Harold B. King, both of Wrightsville Beach, N.C.

[73] Assignee: General Electric Company, San Jose, Calif.

[21] Appl. No.: 924,805

[22] Filed: Aug. 4, 1992

[51] Int. Cl.$^5$ .................................................. G21C 3/18
[52] U.S. Cl. .................................................. 376/412
[58] Field of Search ........................... 376/412, 420

[56] References Cited

U.S. PATENT DOCUMENTS 4,871,509  10/1989  Johansson .................. 376/412

FOREIGN PATENT DOCUMENTS 54-13895   2/1979  Japan ........................ 376/412
58-202892 11/1983  Japan ........................ 376/412

Primary Examiner—Daniel D. Wasil
Attorney, Agent, or Firm—John S. Beulick

[57] ABSTRACT

A fuel pellet retainer spring assembly is disclosed for insertion to the open unsealed end of a fuel rod. The assembly includes a locking sleeve having a normal radial diameter exceeding the inside radial diameter of the fuel rod cladding. This sleeve is compressed to a diameter less than the inside diameter of the fuel rod cladding. Thereafter, the sleeve is inserted. In the preferred embodiment, a washer and coil spring precedes the sleeve into the fuel rod. The sleeve is inserted and thereafter allowed to expand and frictionally hold to the inside wall of the cladding. When the sleeve is in place, the coil bears against the inside portion of the radial sleeve and forms the surface from which a fuel pellet biasing spring maintains fuel pellets within the unsealed fuel rod.

12 Claims, 4 Drawing Sheets

LOCKING SLEEVE PLENUM SPRING RETAINER

This invention relates to fuel rods utilized in nuclear reactor fuel bundles, typically boiling water nuclear reactors. More particularly, a retaining spring arrangement is disclosed for maintaining fuel pellets within a fuel rod before sealing of the fuel rod. Embodiments of the spring are disclosed together with a tool for spring insertion.

BACKGROUND OF THE INVENTION

Johansson et al. U.S. Pat. No. 4,871,509 entitled FUEL COLUMN RETAINER USING RADIALLY COMPRESSED SPRING issued Oct. 3, 1989 disclosed a coil spring for retaining fuel pellets interior of a fuel rod independent of the sealing end plug of the fuel rod. In at least one embodiment, the device included a coil spring having two discrete portions. One locking portion of the coil spring has an outside diameter of the coil spring that slightly exceeds the inside diameter of the fuel rod. This locking portion of the coil spring is used to bear against inside walls of the cladding to radially wedge the spring in place relative to the inside walls of the cladding. Because the locking portion of the spring keys to the inside walls of the cladding, the locking portion of the spring adheres to the cladding even though the end plug of the fuel rod is not yet installed.

Another biasing portion of the spring had a diameter less than the inside diameter of the cladding. This biasing portion of the spring acted from the locking portion to and towards the loaded fuel pellets. This spring portion supplied the necessary bias on the fuel pellets to maintain the pellets in place in the interior of the fuel rod before the ends of the fuel rod cladding were sealed.

Insertion of the locking portion of the spring is easy to understand. Specifically, the locking portion of the coil spring having the larger diameter is literally wound so as to cause the diameter of the coil spring to contract. This locking portion of the spring is thus contracted from a diameter that is slightly larger than the inside diameter of the cladding to a diameter that is slightly smaller than the inside diameter of the cladding. When the spring is suitably contracted in diameter, it is inserted to the designed depth within the cladding tube. Such insertion is made with the biasing portion of the spring being inserted into the cladding first so as to compress the already inserted pellets. Thereafter, the large and spirally wound locking portion of the spring is released. The coil spring unwinds, expands and frictionally keys to the inside walls of the cladding. As a result, inserted fuel pellets are spring biased and held in place after spring insertion and well before sealing of the ends of the cladding. The disclosure also included a tool for the winding insertion of the two portion retainer coil spring.

This two portion locking and biasing coil spring arrangement does have disadvantages. First, the diametrical stress on the cladding by the wound coil spring of the locking portion is additive to that radial stress generated by pressure interior of the fuel rod. This pressure can increase during in-service fuel bundle life. Further, and because the locking spring portion is to and toward the end of the fuel rod cladding, this pressure is concentrated at one end of the fuel rod cladding. More importantly, the amount of this radial force has not been precisely predictable.

Further, the winding of the spring has not always been uniform. Moreover, the locking portion of the spring can become cocked with respect to the cladding. Further, since the coil spring must be constructed from a spring steel such as Inconel having a high neutron capture cross section, the coil spring is not particularly efficient from a nuclear standpoint in its capture of neutrons.

For at least these reasons, the coil spring design has not found wide spread use for pellet retention interior of fuel rods.

SUMMARY OF THE INVENTION

A fuel pellet retainer spring assembly is disclosed for insertion to the open unsealed end of a fuel rod. The assembly includes a locking sleeve, and a coil spring which preferably has bearing washers at either end of the coil spring. The locking sleeve has a normal radial diameter exceeding the inside radial diameter of the fuel rod cladding This sleeve is compressed to a diameter less than the inside diameter of the fuel rod cladding. Thereafter, the sleeve is inserted. In the preferred embodiment, a washer and coil spring precede the sleeve into the fuel rod. The sleeve is inserted and thereafter allowed to expand and key to the inside wall of the cladding When the sleeve is in place, the coil is compressed between the bottom of the sleeve and the top of the fuel column, preventing axial motion of the fuel column. Variations of the sleeve portion of the spring are disclosed for producing a uniform and predictable radial stress on the cladding without danger of the sleeve becoming angularly cocked with respect to the inside walls of the cladding. A tool for producing compression of the sleeve during insertion is set forth.

DESCRIPTION OF THE PREFERRED EMBODIMENT

Figure 1:
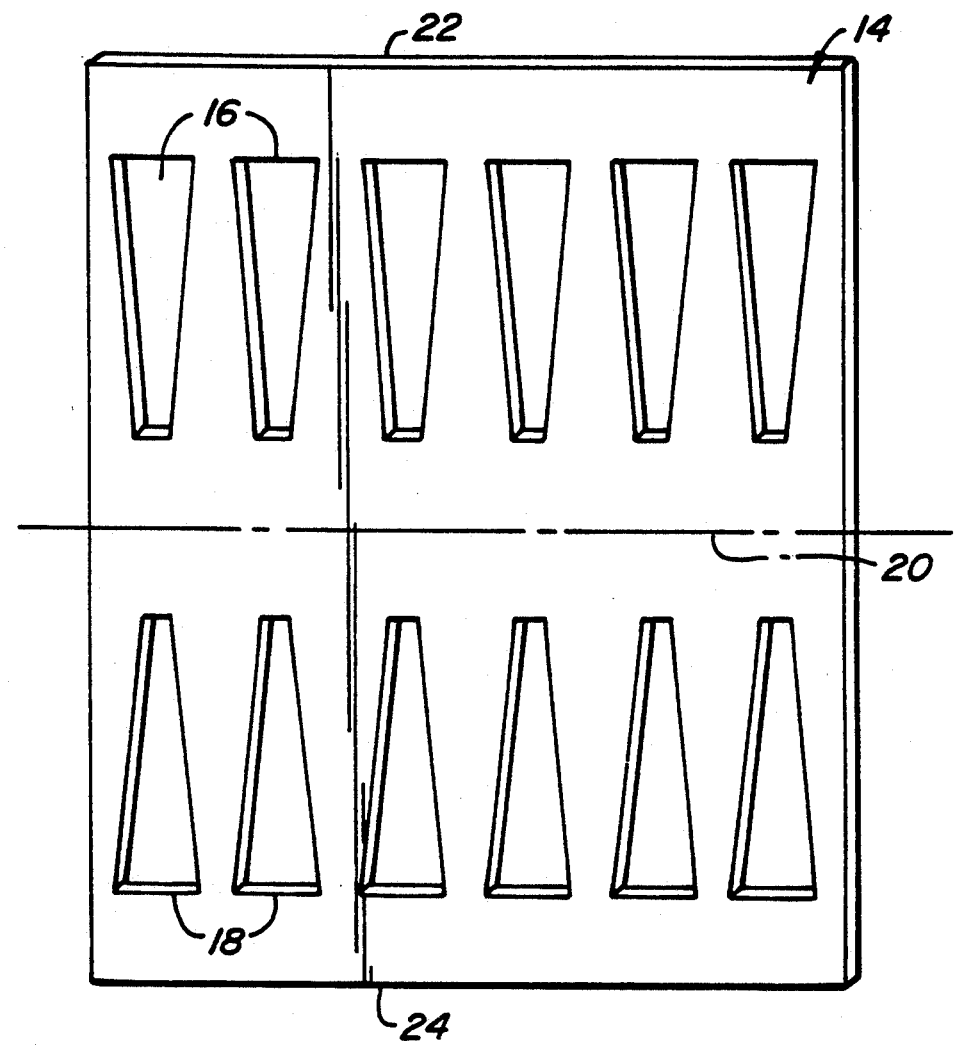
FIG. 1 is a plan view of a sheet metal blank illustrating the expanding generally cylindrical sleeve of this invention before bending into a cylindrical format and illustrating punched areas in the metal forming the sleeve for imparting to the finally bent sleeve uniform elastic forces for substantially uniform radial pressures on the walls of the cladding to which it is inserted.

Referring to FIG. 1, a stamped metal sheet 14 is illustrated with trapezoidal apertures 16, 18 symmetrically cut relative to an axis 20. Apertures 16, 18 have their truncated apex adjacent axis 20 with their respective base adjacent side edges 22, 24 of sheet 14. Preferably, the material from which sheet 14 is formed is a metal having a low neutron absorption cross section such as an alloy of zirconium.

Figure 2:
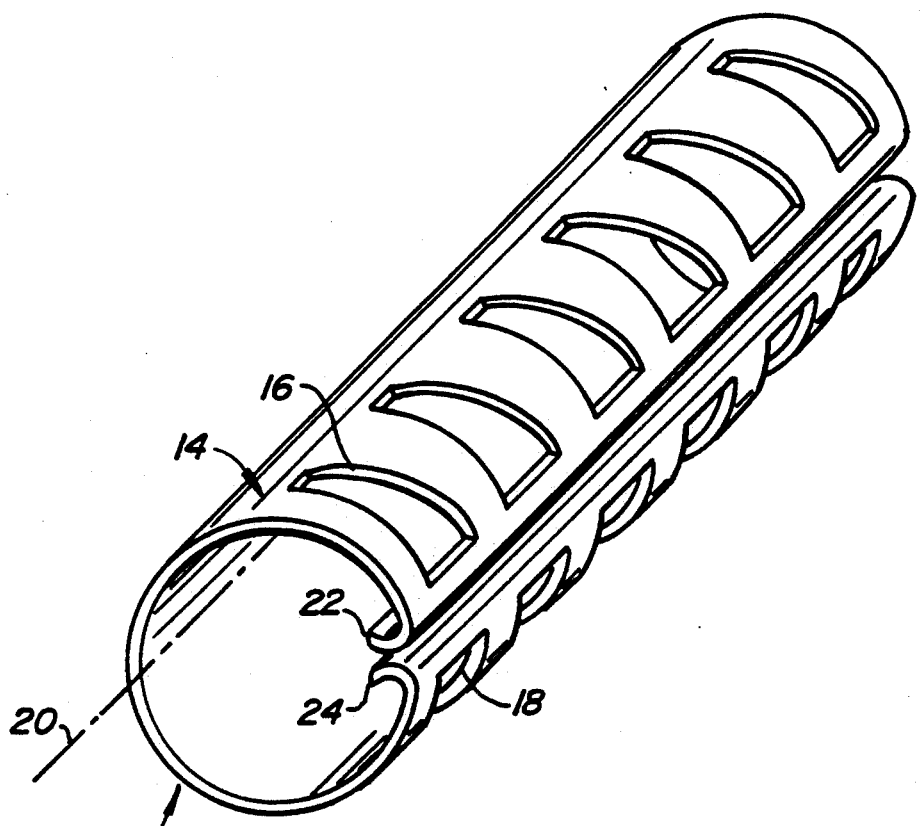
FIG. 2 is a perspective view of the sheet metal of FIG. 1 bent into the generally circular sleeve for locking into the interior of a cylindrical fuel rod cladding.

Referring to FIG. 2, sheet 14 has been bent to a generally cylindrical configuration to form sleeve S. Respective edges 22, 24 have been bent inwardly in a sharply departing arcuate configurations departing from the otherwise cylindrical contour of sleeve S. As will here in after be explained, these edges enable the sleeve to be grasped from the inside, radially compressed by moving the respective edges 22, 24 adjacent one another to form a smaller diameter, and inserted for release and expansion to lodge the sleeve interior of cylindrical cladding utilized in fuel rods.

Figure 3:
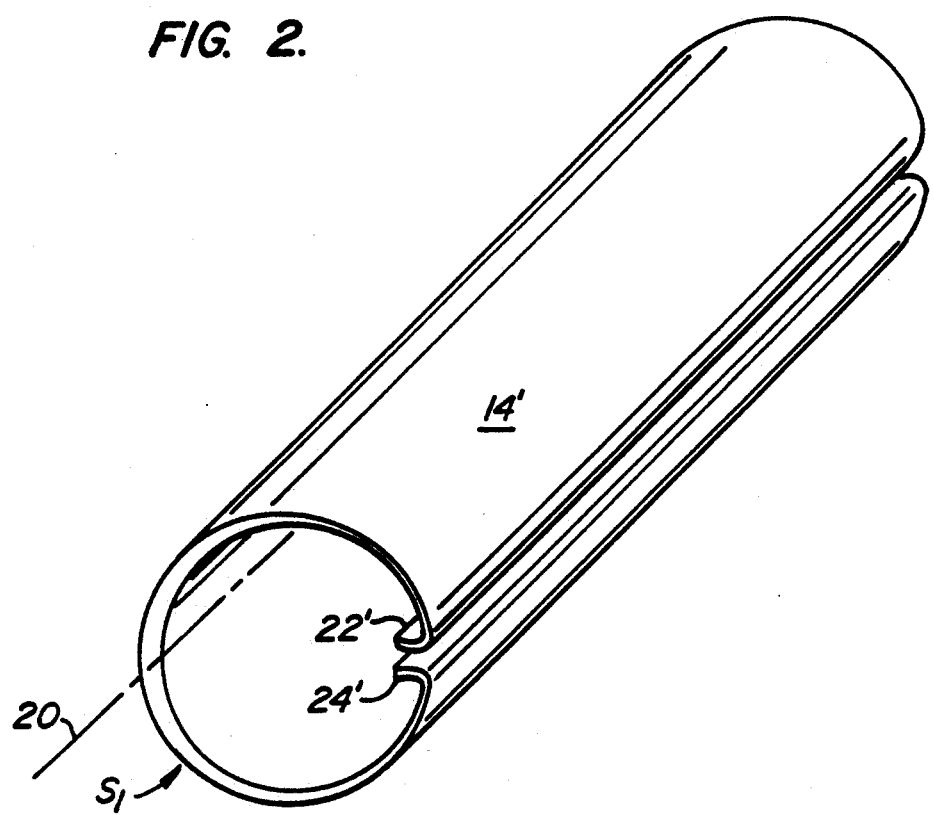
FIG. 3 is a perspective view of an alternate construction of the sleeve illustrating a tapered construction of the otherwise flat metal sheet from which the sleeve is formed.

FIG. 3 is a sleeve $S_1$ similar to sleeve S of FIG. 2, only formed from a sheet 14 having a tapered construction from a thick side wall adjacent axis 20 to thin sidewalls adjacent edges 22', 24'. It has been found that this construction exerts a uniform radial pressure on the inside of the cylindrical cladding of a fuel rod.

Figure 4:
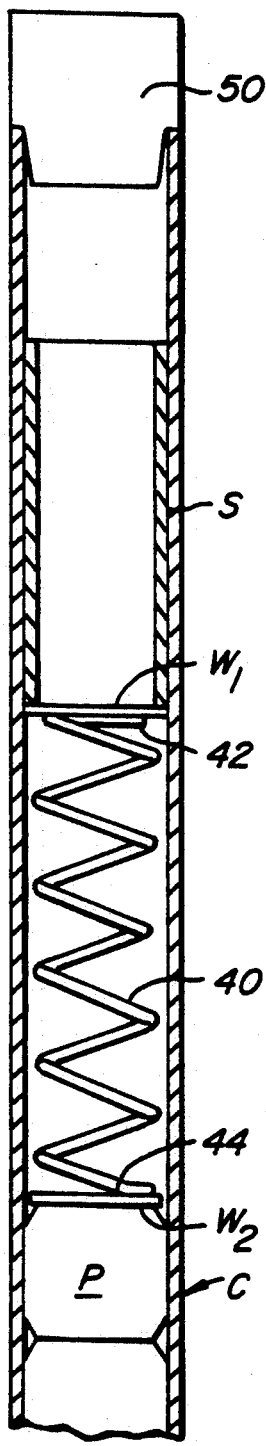
FIG. 4 is a side elevation section at the end of a sealed fuel rod illustrating the installed sleeve, first sleeve bearing washer, and coil spring for biasing through a second pellet bearing washer the previously installed nuclear fuel pellets within the fuel rod.

FIG. 4 illustrates the sleeve S of this invention installed within and keyed to the inside cylindrical diameter of cylindrical cladding C having nuclear fuel pellets previously inserted within the fuel rod. Coil spring 40 is compressed between washer $W_1$ at end 42 bearing against sleeve S and at end 44 bearing against washer $W_2$ which in turn bears against pellets P interior of cladding C. The reader can understand that at the opposite end of the cladding C, spring 40 and one of the washers W may be omitted.

Figure 5:
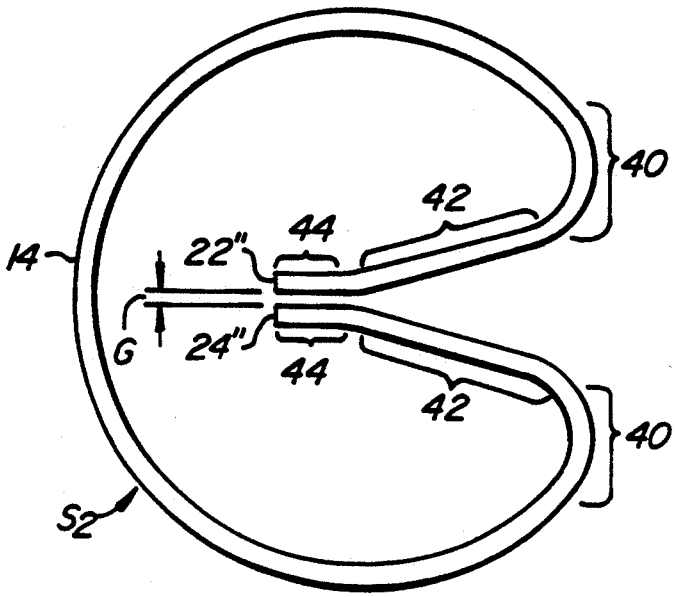
FIG. 5 is an end elevation of the locking sleeve of this invention illustrating an embodiment where the shape of the cylindrical bending generally results in uniform radial pressure on the cladding into which the locking sleeve is inserted.

FIG. 5 shows an alternate embodiment in the form of sleeve $S_2$ wherein the shape of the sleeve causes a substantially uniform radial pressure on the side walls of cladding C into which sleeve $S_2$ is inserted. Specifically, sleeve $S_2$ has sharp radius of curvature 40 with inclined linear legs 42 followed on by parallel linear sections 44 adjacent respective edges 22", 24". In the free state there is a gap G between the ends 22", 24". When the sleeve is in position inside the fuel rod, the gap G is closed and there is a force between the edges 22", 24". This force causes bending in the legs 42, sharply curved regions 40, and in the main body of the sleeve. This bending causes the sleeve to exert a uniform pressure over the inside of the fuel rod.

Figure 6:
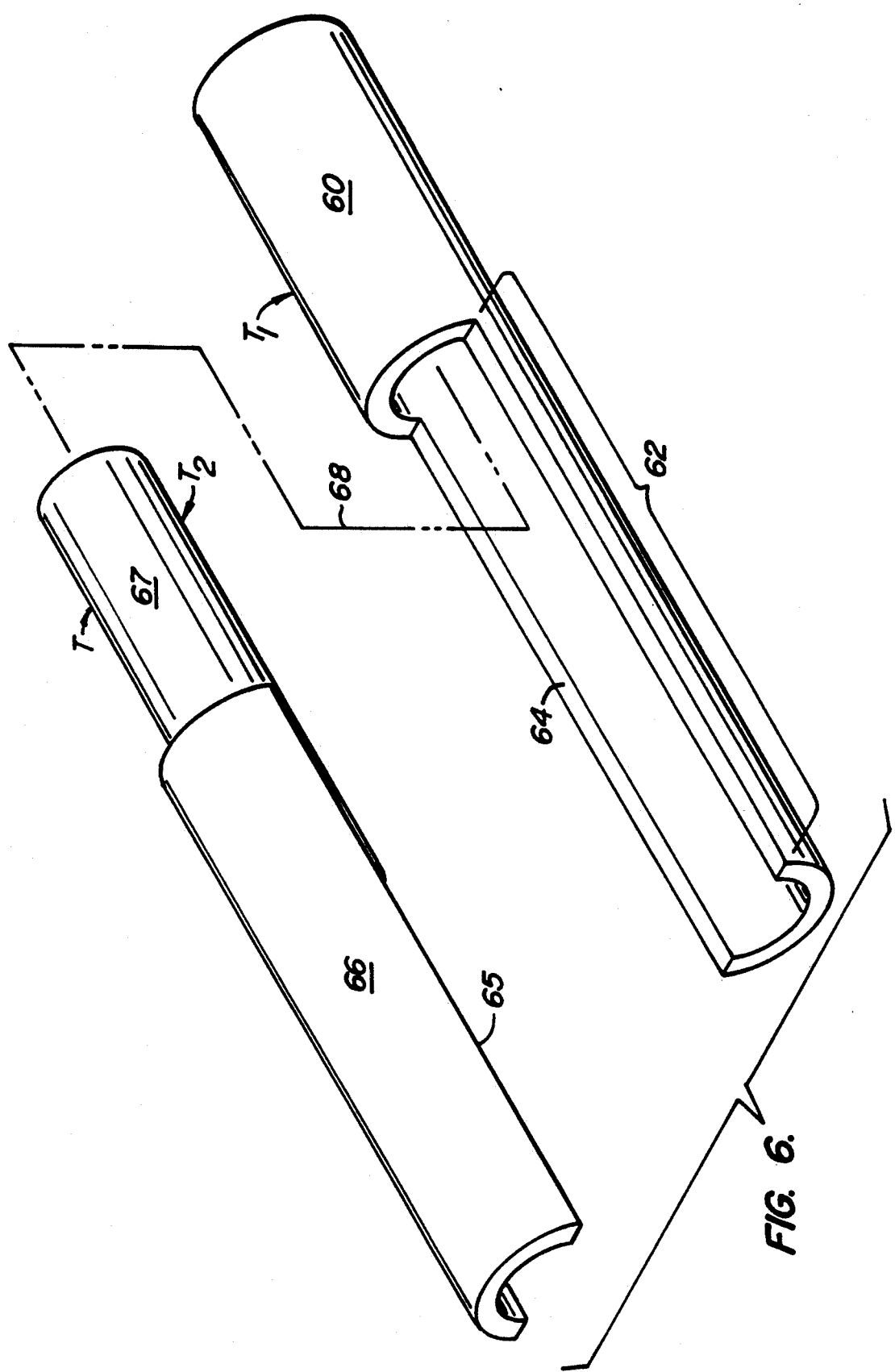
FIG. 6 is an exploded schematic of a tool for inserting the cylindrical sleeve of this invention into the end of a cladding tube; and, FIG. 7 is an end elevation of a locking cylinder and the insertion tool of FIG. 6 illustrating the action of the tool in compressing a locking cylinder for insertion into a cladding tube.

Referring to FIG. 6, the two pieces of a tool T for the radial compression and insertion of sleeves S, $S_1$, and $S_2$ are illustrated. Tool section $T_1$ is a cylindrical pipe 60 having an outside diameter less than the inside diameter of cladding C (See FIG. 4). A semi-cylindrical segment 66 is cut from cylinder 60 at length 62.

Referring to tool section $T_2$, semi-cylindrical segment 66 is shown fastened to rod 67. Rod 67 has a diameter which permits insertion into the interior diameter of cylinder 60 (See arrow 68). Preferably, tool T is fabricated so as to permit relative rotation between edge 64 on cylinder 60 and edge 65 attached to rod 66. These respective edges 64, 65 effect radial compression of sleeve S when relative rotation of the respective tool sections $T_1$ and $T_2$ occurs.

Figure 7:
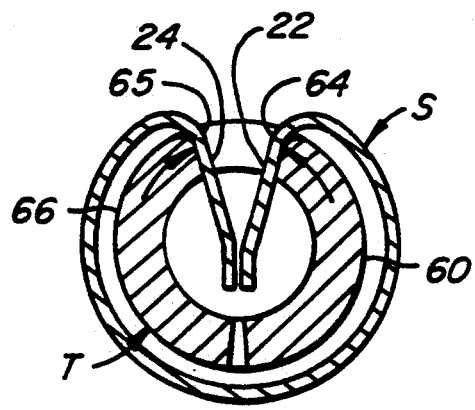

Assuming the insertion of the rod 67, operation of the tool T can be understood in the end elevation of FIG. 7. Respective tube portions 60, 66 rotate towards one another at edges 64, 65. This causes sleeve S to contract. When the sleeve S is contracted it is inserted; when sleeve S is fully inserted it is released.

What is claimed is:

1. In a fuel rod for a nuclear reactor comprising in combination:

cylindrical fuel rod cladding having at least one open end and a far end of said cylindrical cladding with a predetermined cylindrical inside diameter therebetween for receiving a plurality of cylindrical nuclear fuel pellets within said cladding;

a plurality of cylindrical nuclear fuel pellets having a diameter less than the inside diameter of said cladding inserted from said open end of said fuel rod cladding towards the far end of said fuel rod cladding;

means for limiting penetration of said cylindrical fuel pellets at the far end of said fuel rod cladding; and means for maintaining said fuel pellets within said cladding at said open end of said cladding:

the improvement to said means for maintaining said fuel pellets within said cladding at the open end of said cladding comprising:

a generally elastic and cylindrical sleeve having a removed linear portion of the sleeve along the axial length of said sleeve and having an outside diameter exceeding the inside diameter of said cladding, said generally elastic and cylindrical sleeve compressible along said removed linear portion of said sleeve to a diameter less than said inside diameter of said cladding whereby insertion of said sleeve interior of said cladding can occur when said sleeve is elastically compressed;

said generally elastic and cylindrical sleeve inserted to said cladding and in radially expanded elastic contact with the inside wall of said cladding whereby said sleeve is frictionally held to said cladding; and, means between said sleeve and said fuel pellets for maintaining said fuel pellets under compression from said sleeve interior of said fuel rod cladding;

first means for grasping said generally elastic and cylindrical sleeve defined adjacent one said removed linear portion of said sleeve for enabling compression of said cylinder from the inside of said cylinder; and second means for grasping said generally elastic and cylindrical sleeve defined adjacent the other said removed linear portion of said sleeve for enabling compression of said cylinder from the inside of said cylinder.

2. The invention of claim 1 and wherein:

means for exerting uniform radial tension on said cladding from said generally elastic and cylindrical sleeve.

3. The invention of claim 2 and wherein said means for exerting uniform radial tension on said cladding from said generally elastic and cylindrical sleeve includes:

said generally elastic and cylindrical sleeve being bent with an increasing radius of curvature adjacent said removed linear portion of said sleeve.

4. The invention of claim 2 and wherein:

said means for exerting uniform radial tension on said cladding from said generally elastic and cylindrical sleeve includes:

said generally elastic and cylindrical sleeve having a portion of said cylinder removed for exerting a uniform radial stress on said open end of said cladding.

5. The invention of claim 2 and wherein:

said means for exerting uniform radial tension on said cladding from said generally elastic and cylindrical sleeve includes:

having a non-uniform thickness.

6. A fuel rod for a nuclear reactor comprising:

cylindrical fuel rod cladding having at least one open end and a far end of said cylindrical cladding with a predetermined cylindrical inside diameter therebetween for receiving a plurality of cylindrical nuclear fuel pellets within said cladding;

a plurality of cylindrical nuclear fuel pellets having a diameter less than the inside diameter of said cladding inserted from said open end of said fuel rod cladding towards the far end of said fuel rod cladding;

means for limiting penetration of said cylindrical fuel pellets at the far end of said fuel rod cladding;

a generally elastic and cylindrical sleeve having a removed linear portion of the sleeve along the axial length of said sleeve and having an outside diameter exceeding the inside diameter of said cladding, said generally elastic and cylindrical sleeve compressible along said removed linear portion of said sleeve to a diameter less than said inside diameter of said cladding whereby insertion of said sleeve interior of said cladding can occur when said sleeve is elastically compressed;

said generally elastic and cylindrical sleeve inserted to said cladding and in radially expanded elastic contact with the inside wall of said cladding whereby said sleeve is frictionally held to said cladding;

means between said sleeve and said fuel pellets for maintaining said fuel pellets under compression from said sleeve interior of said fuel rod cladding;

first means for grasping said generally elastic and cylindrical sleeve defined adjacent one said removed linear portion of said sleeve for enabling compression of said cylinder from the inside of said cylinder; and, second means for grasping said generally elastic and cylindrical sleeve defined adjacent the other said removed linear portion of said sleeve for enabling compression of said cylinder from the inside of said cylinder.

7. The invention of claim 6 and wherein said generally cylindrical sleeve includes:

means for exerting uniform radial tension on said cladding from said generally elastic and cylindrical sleeve.

8. The invention of claim 7 and wherein said means for exerting uniform radial tension on said cladding from said generally elastic and cylindrical sleeve includes said generally elastic and cylindrical sleeve having a non-uniform thickness for exerting a uniform radial stress on said open end of said cladding.

9. The invention of claim 7 and wherein said means for exerting uniform radial tension on said cladding from said generally elastic and cylindrical sleeve includes:

said generally elastic and cylindrical sleeve having inwardly projecting arms, said arms pressing against each other when said sleeve is installed in fuel rod, causing said sleeve to deform and exert uniform pressure on inside of fuel rod.

10. The invention of claim 7 and wherein said means for exerting uniform radial tension on said cladding from said generally elastic and cylindrical sleeve includes:

said generally elastic and cylindrical sleeve having a changing radius of curvature on the substantially cylindrical sidewalls for exerting a uniform radial stress on said open end of said cladding.

11. The invention of claim 7 and wherein said means for exerting uniform radial tension on said cladding from said generally elastic and cylindrical sleeve includes:

portions of said generally elastic and cylindrical sleeve being removed.

12. In a fuel rod for a nuclear reactor including cylindrical fuel rod cladding having at least one open end and a far end of said cylindrical cladding with a predetermined cylindrical inside diameter therebetween for receiving a plurality of cylindrical nuclear fuel pellets within said cladding, apparatus for maintaining said fuel pellets within said cladding comprising:

a generally elastic and cylindrical sleeve having a removed linear portion of the sleeve along the axial length of said sleeve and having an outside diameter exceeding the inside diameter of said cladding, said generally elastic and cylindrical sleeve compressible along said removed linear portion of said sleeve to a diameter less than said inside diameter of said cladding whereby insertion of said sleeve interior of said cladding can occur when said sleeve is elastically compressed;

means for grasping said generally elastic and cylindrical sleeve defined adjacent said removed linear portions of said sleeve for enabling compression of said cylinder from the inside of said cylinder;

said generally elastic and cylindrical sleeve inserted to said cladding and in radially expanded elastic contact with the inside wall of said cladding whereby said sleeve is frictionally held to said cladding; and, means between said sleeve and said fuel pellets for maintaining said fuel pellets under compression from said sleeve interior of said fuel rod cladding.

* * * * *